US008966353B2

(12) United States Patent
Zhou et al.

(10) Patent No.: US 8,966,353 B2
(45) Date of Patent: Feb. 24, 2015

(54) RECEIVER WITH TAP-COEFFICIENT ADJUSTMENTS

(75) Inventors: Dacheng Zhou, Fort Collins, CO (US); Daniel Alan Berkram, Loveland, CO (US)

(73) Assignee: Hewlett-Packard Development Company L.P., Houston, TX (US)

(*) Notice: Subject to any disclaimer, the term of this patent is extended or adjusted under 35 U.S.C. 154(b) by 150 days.

(21) Appl. No.: 13/285,293

(22) Filed: Oct. 31, 2011

(65) Prior Publication Data
US 2013/0111307 A1 May 2, 2013

(51) Int. Cl.
G06F 11/00 (2006.01)
H04L 25/03 (2006.01)

(52) U.S. Cl.
CPC ... *H04L 25/03057* (2013.01); *H04L 2025/0349* (2013.01); *H04L 2025/03592* (2013.01)
USPC .......................................................... 714/799

(58) Field of Classification Search
CPC ............ H04L 1/0061; H04L 25/03057; H04L 25/03178; H04L 23/02; H04L 27/01; H04L 27/00; H04L 27/02; H04L 27/04; H04L 25/4927; H05K 999/99; G06F 11/10; G06F 11/1008; G06F 11/1076; H04B 1/10
See application file for complete search history.

(56) References Cited

U.S. PATENT DOCUMENTS

| | | | | |
|---|---|---|---|---|
| 4,004,226 A | * | 1/1977 | Qureshi et al. | 375/231 |
| 5,150,379 A | * | 9/1992 | Baugh et al. | 375/232 |
| 5,283,531 A | * | 2/1994 | Serizawa et al. | 329/316 |
| 5,596,605 A | * | 1/1997 | Kiyanagi et al. | 375/326 |
| 5,648,987 A | * | 7/1997 | Yang et al. | 375/232 |
| 5,710,792 A | * | 1/1998 | Fukawa et al. | 375/229 |
| 5,742,642 A | * | 4/1998 | Fertner | 375/233 |
| 6,144,708 A | * | 11/2000 | Maruyama | 375/327 |
| 6,389,064 B1 | * | 5/2002 | Dholakia et al. | 375/222 |
| 6,665,308 B1 | * | 12/2003 | Rakib et al. | 370/441 |
| 6,680,971 B1 | | 1/2004 | Tazebay et al. | |
| 7,123,653 B2 | | 10/2006 | Kim et al. | |
| 7,460,594 B2 | * | 12/2008 | Yousef | 375/233 |
| 7,916,779 B1 | * | 3/2011 | Zhu | 375/229 |
| 2002/0054655 A1 | * | 5/2002 | Malkemes et al. | 375/347 |
| 2002/0106040 A1 | * | 8/2002 | Malkemes et al. | 375/347 |
| 2002/0186764 A1 | * | 12/2002 | Amin et al. | 375/233 |
| 2003/0156603 A1 | * | 8/2003 | Rakib et al. | 370/485 |

(Continued)

FOREIGN PATENT DOCUMENTS

JP 2006074314 A 3/2006

OTHER PUBLICATIONS

Giorgio Pichchi et al., "Blind Equalization and Carrier Recovery Using a "Stop-and-Go" Decision Directed Algorithm," Sep. 1987, Communications, IEEE Transactions on (vol. 35 , Issue: 9 ) , pp. 877-887.*

Yilmaz, Mehmet Mustafa, "2. Blind Adaptive Multiuser Detection with Signature Waveform Estimation", (Undated Project Report) earlier than Jan. 19, 2011, Abstract, Introduction, and Conclusion and Future Work.

(Continued)

*Primary Examiner* — Albert Decady
*Assistant Examiner* — Enamul M Kabir
(74) *Attorney, Agent, or Firm* — Clifton L. Anderson

(57) ABSTRACT

A receiver can include a sampler module for sampling a data-bearing input signal to extract data encoded in the data-bearing analog input signal. The sampling results in data-symbol sequences. The data-symbol sequences can be used to identify error events. The identified error events can be used as a basis for adjusting tap coefficients. The tap coefficients can be used in setting reference levels for the sampler module.

19 Claims, 3 Drawing Sheets

(56) References Cited

U.S. PATENT DOCUMENTS

| | | | |
|---|---|---|---|
| 2004/0028159 A1* | 2/2004 | Abdelilah et al. | 375/350 |
| 2005/0180498 A1* | 8/2005 | Bhakta et al. | 375/233 |
| 2007/0002845 A1* | 1/2007 | Kelly et al. | 370/354 |
| 2008/0063043 A1* | 3/2008 | Xia et al. | 375/233 |
| 2010/0020860 A1 | 1/2010 | Dai et al. | |
| 2010/0266006 A1* | 10/2010 | Werner et al. | 375/232 |

OTHER PUBLICATIONS

He, Lin, et al., "3. A Hybrid Adaptive Blind Equalization Algorithm for QAM Signals in Wireless Communications", (Research Paper) IEEE Transactions in Signal Processing, vol. 52, No. 7, Jul. 2004.

* cited by examiner

RECEIVER WITH TAP-COEFFICIENT ADJUSTMENTS

BACKGROUND

Digital data can be physically encoded as amplitude levels in an analog signal. For example, binary data consisting of logic highs and logic lows can be encoded as a waveform having voltage high and voltage low steps. The data-bearing analog signal can be communicated via an analog channel (e.g., between integrated circuits via a printed-circuit board) to a receiver, which must extract the digital data from the analog signal, e.g., by periodically sampling the analog signal.

"Sampling" refers to a process of determining an instantaneous parameter (e.g., voltage) value for an analog signal. For example, an instantaneous high voltage can indicate a logic high symbol, while an instantaneous low voltage can indicate a logic low symbol. Sampling results can vary according to the timing (phase) and reference levels applied. For example, invalid data (which may, nonetheless, be useful for some purposes) can result from sampling at the transitions between highs and lows or by using a reference level above or below the dynamic range of the analog signal. Valid data can be obtained by sampling between transitions and using a reference amplitude (e.g., voltage) near the center of the analog signal amplitude (e.g., voltage) range. Timing recovery circuits are available for extracting timing from the analog signal.

A "decision feedback equalizer" or "DFE" is a device that makes adjustments in a receiver based on previously determined ("decided") symbol values. A DFE can be used to help set reference levels based on previously decided symbol values. The previously decided symbol values are multiplied by "tap coefficients" and the resulting products are summed to provide a reference level or a level from which a reference level can be derived. The tap coefficients can be set based on a calibration procedure using a training symbol sequence.

BRIEF DESCRIPTION OF THE DRAWINGS

The following figures represent examples and not the invention itself.

DETAILED DESCRIPTION

A receiver may recover data from an incoming signal by sampling the signal relative to a reference level. Selecting a suitable reference level can reduce inter-symbol interference. A decision feedback equalizer (DFE) can be used to generate reference levels based on previously decided symbol values. Generally, more recently decided data symbols may have a greater influence on reference levels than less recently decided data symbols. Accordingly, "tap-coefficients" are used to weigh the contributions of recently decided data-symbol values to the determination of a sampling reference level.

Some communications protocols provide for training sequences during an initialization phase to allow a transmitter and a receiver to calibrate and adjust parameters (e.g., tap coefficients) to minimize communications errors during subsequent normal (non-calibration) operation. Designing a communication system to use a variety of training sequences associated with different protocols can be a daunting task and result in an unduly complex system.

Figure 1:
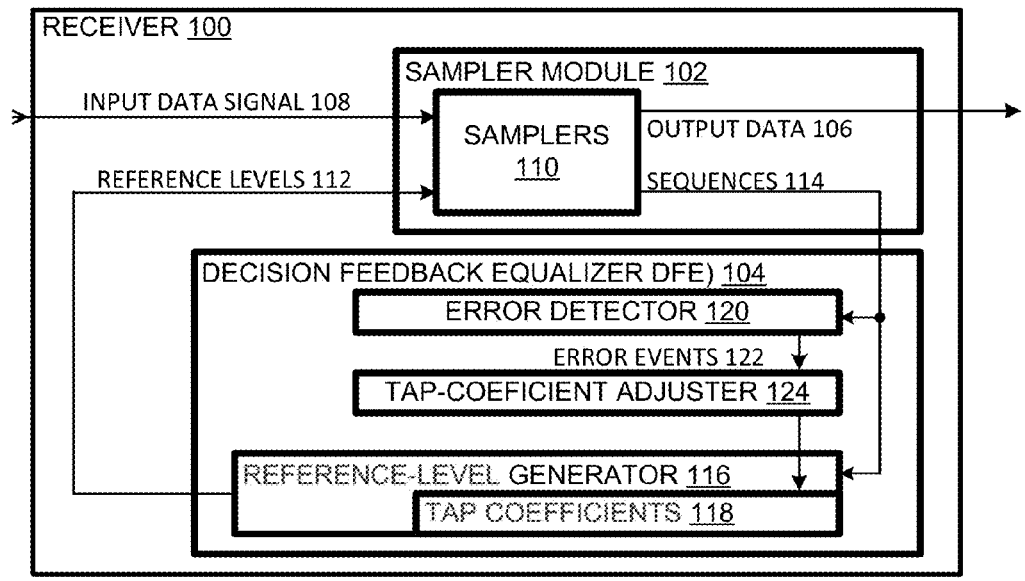
FIG. 1 is a schematic diagram of a receiver in accordance with an example.

Accordingly, a receiver 100, shown in FIG. 1, provides for "blind" adjusting tap coefficients based on data-symbol sequences resulting from sampling a data-bearing input signal. The adjustment is "blind" in that it does not rely on a training sequence of known data symbols. Instead of a training sequence, receiver 100 bases its adjustments on adjustment values associated with error events occurring in the context of data sequences resulting from sampling.

Receiver 100 can thus adjust tap coefficients when there is no training sequence and also is "agnostic" regarding any training sequence that is implemented. Accordingly, receiver 100 is compatible with communications protocols that may present different training sequences or none at all. Receiver 100 can adjust tap coefficients to achieve useful initial values. In addition, receiver can gradually adjust tap coefficients to match changing conditions without waiting for the occurrence of a training sequence.

Receiver 100 includes a sampler module 102 and a decision feedback equalizer 104. Receiver 100 is designed to generate an output data-symbol sequence 106 by sampling an input data signal 108. Sampler module 102 includes samplers 110 arranged to receive instances of input data signal 108 for sampling using respective reference levels 112. Sampler module 102 receives input data signal 108 and outputs data-symbol sequences 114, which may include output data 106.

DFE 104 includes a reference-level generator 116 that generates reference levels 112 used by samplers 110 based on the data-symbol sequences 114 output by sampler module 102 and tap coefficients 118. DFE 104 includes an error detector 120 for detecting error events 122 based on data symbol sequences 114. DFE 104 includes a tap-coefficient adjuster 124 that adjusts tap coefficients 118 based on error events 122 and data symbol sequences 114.

Figure 2:
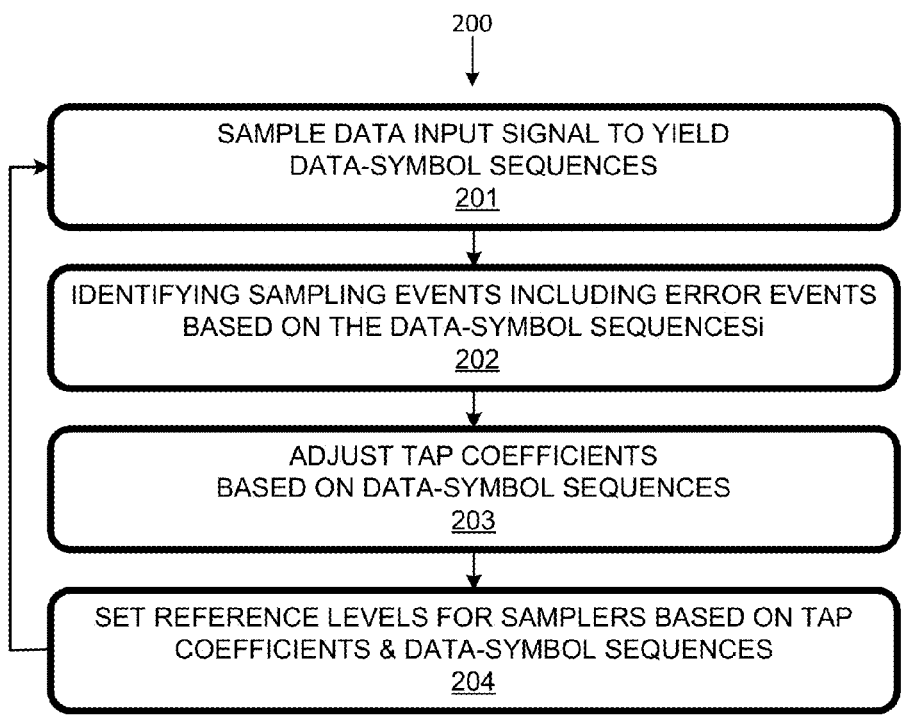
FIG. 2 is a flow chart of a process implementable in the receiver of FIG. 1 in accordance with an example.

Receiver 100 implements a process 200, flow charted in FIG. 2. At 201, sampler module 102 samples analog data input signal to yield data symbol sequences. At 202, error events are identified based on the data symbol sequences. At 203, tap coefficients are adjusted based on the error events. At 204, reference levels are set for sampler module 102 based on the tap coefficients and the data-symbol sequences. Process 200 iterates by returning to 201 and using the new reference levels to sample the input data signal to extend the data symbol sequences. Accordingly, tap-coefficients are adjusted "blind", i.e., without training sequences.

Figure 3:
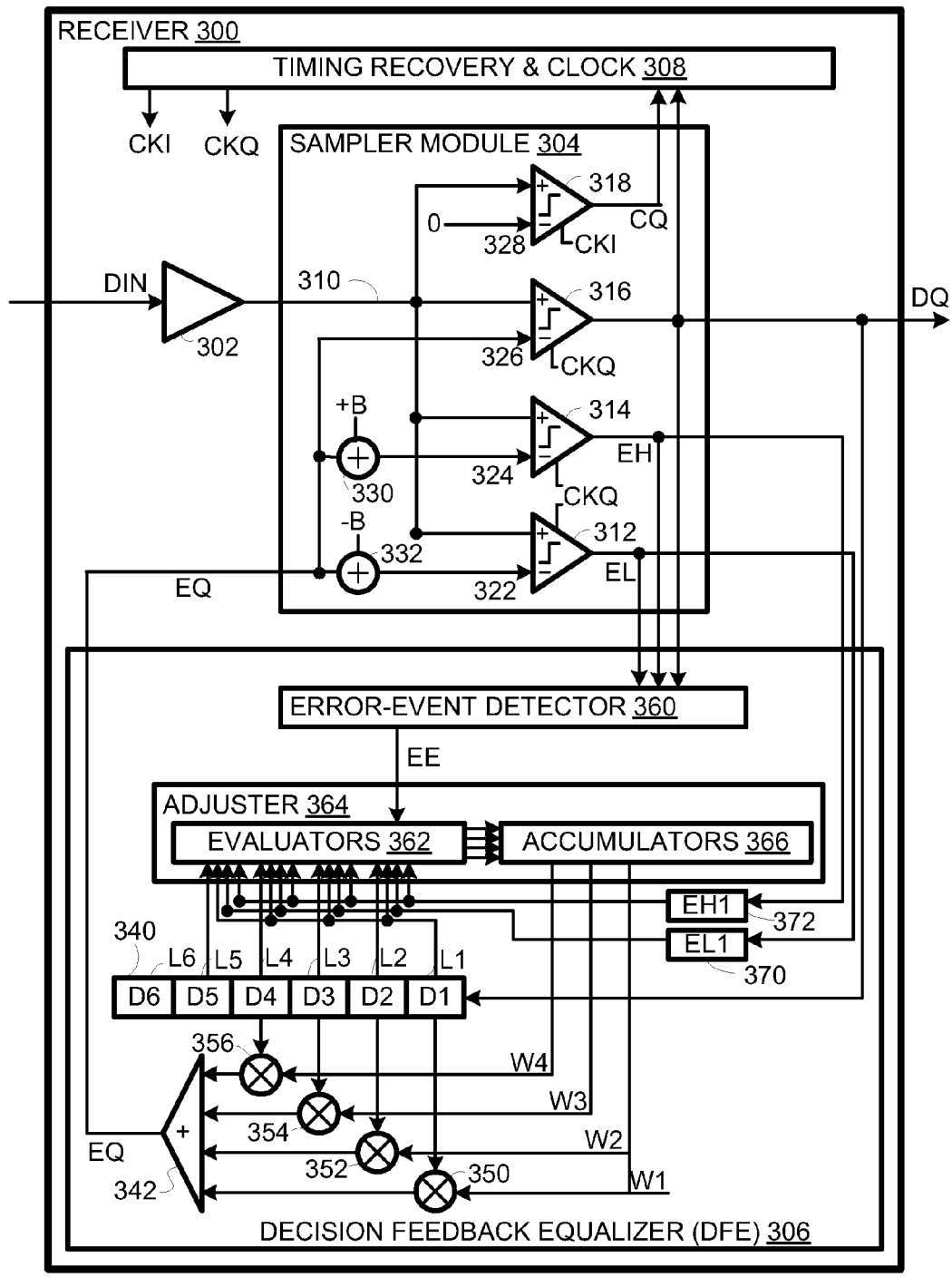
FIG. 3 is an example of a receiver having offset samplers in accordance with an example.

A receiver 300, shown in FIG. 3, includes a front-end amplifier 302, a sampler module 304, a decision feedback equalizer 306 and a timing-recovery and clock module 308. Front-end amplifier 302 corrects for some channel distortion and amplifies a received input data signal DIN to yield an amplified input data signal 310. Sampler module 304 includes samplers 312, 314, 316, and 318. Each of samplers 312, 314, 316, 318 has a data ("+") input for receiving an instance, e.g., "fan-out" of amplified input data signal 310. In addition, each sampler 312, 314, 316, 318 has a reference ("−") input for receiving a respective reference level 322, 324, 326, 328.

Data sampler 316 samples a fan-out of amplified input signal 310 relative to reference level 326 to yield an output data-symbol sequence DQ, which serves as the recovered digital data signal output from receiver 300; reference level 326 is determined by an equalization signal EQ output by DFE 306. Alternative receivers may have more than one output data sampler, as explained further below.

High-offset sampler 314 samples a fan-out of amplified input signal 310 relative to reference level 324, yielding an "error-high" sequence EH; reference level 324 is determined at summer 330 by equalization signal EQ plus a bias level B. Low-offset sampler 312 samples a fan-out of amplified input signal 310 relative to reference level 322, yielding an "error-low" sequence EL; reference level 322 is determined at summer 332 by equalization signal EQ minus bias level B. Alternative receivers may have only one offset sampler, while others have more than two, as explained further below.

Edge sampler 318 samples a fan-out of (differential) amplified input signal 310 relative to reference level 328, a nominal zero voltage level near the transitions between data symbols. Timing-recovery and clock module 308 uses the edge-detection output ED of sampler 318 and the receiver data-symbol sequence DQ to recover the timing from amplified input signal 310. The timing of sampler 318 is controlled by a dithered version of an in-phase clock CKI provided by timing-recovery and clock module 308. Timing-recovery and clock module 308 also outputs a quadrature clock CKQ, which is used to control the timing of data sampler 316 and offset samplers 312 and 314. Alternative receivers can have more than one edge sampler, as explained further below. Also, alternative receivers can use clocks of different frequencies and phases.

Equalization signal EQ and thus reference level 326 are set to optimize sampler 316 for recovering data from amplified input signal 310. Reference levels 324 and 322 bracket reference level 326 from above and below respectively. The amplitude of bias B is small enough that, if 326 is set to an optimal level, then data-symbol sequences DQ, EH, and EL will be identical. An "error-high" event is indicated when data-symbol sequence EH differs from data symbol sequences DQ and EL; an "error-low" event is indicated when EL differs from DQ and EH. In either case, an adjustment to equalization signal EQ may be called for.

DFE 306 generates equalization signal EQ as a function of data-symbol sequence DQ and tap coefficients W1-W4. At any given time, a portion of data-symbol sequence DQ is represented in a first-in-first-out buffer (FIFO) 340 of DFE 306. For example, at the instance represented by FIG. 3, data symbols D1-D6 are stored in respective FIFO locations L1-L6. These stored data symbols are used in generating equalization signal EQ. Thus, equalization signal EQ may change levels any time a new data symbol enters FIFO 340.

Each tap coefficient corresponds to respective number of inter-symbol periods. Tap coefficient W1 corresponds to an interval of size "1", the size of the interval between a data symbol, and its immediate successor, e.g., the interval between data symbols D2 and D1. Tap coefficient W2 corresponds to the size of an inter-symbol interval between a data symbol and its second successor, e.g., between D3 and D1. Tap coefficient W3 corresponds to a three-period interval, e.g., between D4 and D1. Tap coefficient W4 corresponds to a four-period interval, e.g., between D5 and D1. In alternative receivers, more or fewer tap coefficients may be used to accommodate varying degrees of expected inter-symbol interference (ISI) imposed by the signal channel. For example, 16 tap coefficients to handle ISI between pairs of data symbols up to sixteen symbols apart.

Equalization signal EQ is determined as a sum (provided by a summing amplifier 342) of products: a multiplier 350 provides a product of the value (e.g. D1) in FIFO location L1 and tap coefficient W1; a multiplier 352 provides a product of the value (e.g., D2) in FIFO location L2 and tap coefficient W2, and so on for multipliers 354 and 356. While the values stored in FIFO locations L1-L6 change every sampling period, tap coefficients W1-W4 are adjusted relatively infrequently. However, changing channel conditions (affecting the data input signal) and other factors may call for the tap coefficients to be adjusted. Note that for the purpose of calculating the products output from multipliers 350-356, logic high=1 and logic low=−1 (instead of zero).

DFE 306 includes an error-event detector 360 to help determine when to adjust tap coefficients W1-W4. If equalization signal EQ is well centered in the dynamic range of amplified input signal 310, then EL and EH are equal. If EL and EQ are different (e.g., EL is logical high while EH is logic low, while the opposite is precluded), this indicates an error event. If, at the same time, DQ is high, then EH is in error suggesting that EQ is to be adjusted downward; if DQ is low, then EL is in error suggesting that EQ is to be adjusted upward. Thus, error-event detector 360 may, for example, XOR data-symbol sequences EL and EH to detect error events and use DQ to determine whether an error calls for an upward or downward adjustment of equalization signal EQ.

Error-event detector 360 outputs an error-event signal EE identifying each error event and indicating its sense (up or down). Error-event signal EE is input to evaluators 362 of tap-coefficient adjuster 364. Evaluators 362 (one evaluator per tap coefficient) determine from error-event signal the occurrence and sense of each error event. For each tap coefficient W1-W4, evaluators 362 determine whether the respective tap coefficient should be adjusted and, if it is to be adjusted, should it be adjusted in the same sense as or in the opposite sense to the sense of the error event. For example, in some cases, an upward adjustment in a tap coefficient can have a downward effect on equalization signal EQ. The following adjustment evaluations may be employed.

$$Wi \text{ up iff}(EH1 \text{ XOR } EL1)*(D(i+1) \text{ XOR } D1)$$

$$Wi \text{ down iff}(EH1 \text{ XOR } EL1)*(D(i+1) \text{ XNOR } D1)$$

where, i=1, 2, 3, 4, and "iff" means "if and only if". EL1 and EH1 are offset-data-symbol values stored in respective registers 370 and 372 and obtained synchronously with receiver data-symbol value D1.

In some cases, it may be assumed that the data symbol immediately before the next data symbol to be sampled has arrived in FIFO 340. In such a case, DQ=D1 at the instant represented in FIG. 3. However, at high data rates, DQ and D1 can correspond to different data symbols, e.g., D1 may be the immediate predecessor to DQ and two symbols ahead of the next data symbol to be sampled.

Rather than make the indicated adjustments immediately, individual adjustments can be accumulated for each tap coefficient over time. Accordingly, the adjustment values for each tap coefficient are input to respective accumulators to yield accumulated adjustment values. Tap coefficients W1-W4 can be adjusted based on accumulated adjustment values upon certain conditions, e.g., a certain number of clock cycles and/or some minimum magnitude. The adjusted tap coefficients then affect equalization signal EQ so as to improve the accuracy of receiver output DQ.

Figure 4:
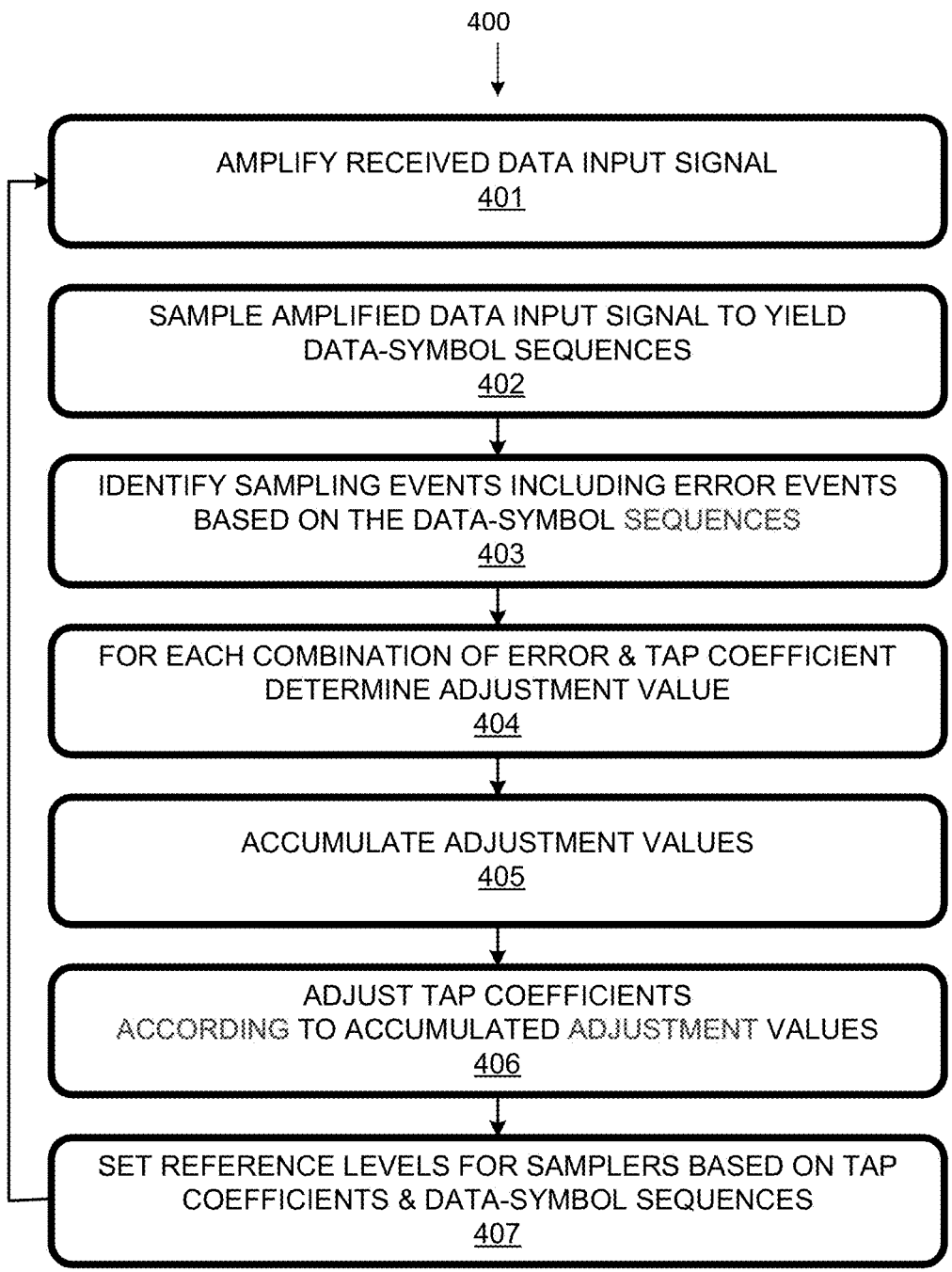
FIG. 4 is a flow chart of a process implementable in the receiver of FIG. 3 in accordance with an example.

Receiver 300 implements a process 400, flow charted in FIG. 4. At 401, a current portion of a received data input signal is amplified. At 402, the amplified data input signal is sampled to yield output-data and offset-data symbol sequences. An output data-symbol sequence can include the data recovered from the input signal.

At 403, error events are detected, e.g., by comparing symbols across symbol sequences. At 404, for each combination of error event and tap coefficient, an adjustment value is determined from the output data and offset data sequences. At 405, individual adjustments values are accumulated over time for each tap coefficient. During accumulations, positive adjustment values can be offset by negative adjustment values and vice versa. At 406, tap coefficients are adjusted according to respective accumulated adjustment values. At 407, the adjusted tap coefficients are used in generating equalization values, which in turn affect the reference values for the samplers. Process 400 can iterate continuously as indicated in FIG. 4 by the return to 401.

Alternative examples include receivers with different numbers of output data, offset data, and edge samplers. For example, higher data rates can be handled by sampling at half the data rate with one sampler handling "even" data symbols and another sampler handling "odd" data symbols; in such a case, a multiplexer operating at the data rate can be used to merge even and odd sequences. If there are even and odd output data samplers, there may (or may not) also be even and odd edge samplers for timing recovery and even and odd samplers for adjusting tap coefficients.

At high data rates the data symbol immediately prior to one about to be sampled may not have had time to be factored in for the purpose of setting sampler reference levels. To address this, separate samplers can be used to sample based on conflicting assumption regarding the value of the immediately prior data symbol. Once the value of the immediately prior symbol is known, it can be used to select the output of the correct sampler for the next data symbol. Aspects of the foregoing examples can be combined so that four samples can be used for even and odd symbols and high and low assumptions regarding the value of an immediately prior data symbol.

In terms of formulae for computing adjustments to tap coefficients, different numbers of tap coefficients may be involved. Since tap coefficients are typically changed slowly, not all data needs to be considered in determining the adjustments to be made. For example, if even and odd data sequences are available, some receivers use only even or only odd offset data for adjusting tap coefficients. Also, it is possible to use as few as one offset sampler and use comparisons with an output data sampler for detecting error events. In such a case, the lack of an error in certain situations may favor an adjustment.

For example, if an output data symbol is high and a high-bias offset data symbol is high, no error is explicit. However, this combination may indicate that the references are too low and that the output data sampler may be at risk of having a reference signal that is too low (as there is no low-bias sampler available to warn of such a condition). In such a case, the combination of a high output data symbol and a high high-bias offset symbol may call for a higher reference level, while a combination of a high output data symbol and a low high-bias offset level may indicate an error calling for a lower reference level. In such an example, low output data values may not be associated with error events or adjustments.

Herein, "process" refers to a sequence of actions resulting in or involving a physical transformation. In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. A process comprising:
    sampling, using plural samplers, an analog data input signal to yield respective data-symbol sequences, said data-symbol sequences including an output data-symbol sequence that is output from a receiver;
    identifying, by comparing symbols across said data-symbol sequences generated by said sampling, sampling events including error events in said data-symbol sequences;
    adjusting tap coefficients of a decision feedback equalizer based on said error events; and
    setting reference levels for said plural samplers based in part on said tap coefficients, said setting including setting a reference level used by a sampler to yield said output data-symbol sequence, the setting including,
        generating an equalization signal as a sum of products of the tap coefficients and data-symbol values of the data-symbol sequences; and
        applying a first bias to said equalization signal to yield a first of the reference signals, and a second bias or no bias to the equalization signal to yield a second reference signal offset with respect to the first reference signal.

2. A process as recited in claim 1 wherein said comparing includes comparisons of offset data-symbol sequences, said offset data-symbol sequences being obtained by sampling said analog data input signal using offset reference levels that are offset from an output reference level used to sample said analog data input signal to yield an output data-symbol sequence output from a receiver that includes said decision feedback equalizer.

3. A process as recited in claim 1 wherein said identifying includes identifying at least some of said error events as either:
    adjust-up error events indicating that a reference level is too low, or
    adjust-down error events indicating that a reference level is too high.

4. A process as recited in claim 3 wherein said adjusting includes:
    accumulating error-event adjustment values associated with said error events to yield accumulated adjustment values for each of said tap coefficients, said error-event adjustment values being accumulated so that values associated with said adjust-down error events offset values associated with said adjust-up error events; and
    applying said accumulated adjustment values to respective tap coefficients.

5. A process as recited in claim 1 wherein the reference levels that provide for offset data-symbol sequences are set both above and below a reference level of a sampler providing values for an output data-symbol sequence for a receiver.

6. A process as recited in claim 1 wherein said reference levels for samplers providing offset data-symbol sequences are set both above and below a reference level of a sampler providing values for a receiver-output data-symbol sequence output from a receiver including said decision feedback equalizer.

7. A process as recited in claim 1 wherein said reference levels for said plural samplers providing offset data-symbol sequences include reference levels set either both above or both below a reference level of an output sampler providing values for an output data-symbol sequence output from a receiver including said decision feedback equalizer.

8. A process as recited in claim 1 wherein said identifying is based at least in part on a comparison of a reference-data symbol sequence generated using a reference voltage level and an offset data sequence using an offset voltage level offset from said reference voltage level.

9. A receiver comprising:
a sampler module to
generate data-symbol sequences at least in part by sampling an input data signal, said sampler module including plural samplers for sampling said input data signal relative to respective reference levels to yield data-symbol sequences, said data-symbol sequences including an output data-symbol sequence output from said receiver; and
a decision feedback equalizer to adjust said respective reference levels for said plural samplers, including a reference level used by a sampler to yield said output data-symbol sequence, based on said data-symbol sequences and tap coefficients of said decision feedback equalizer, said decision feedback equalizer including,
an error-event detector to identify error events by comparing symbols across said data-symbol sequences generated by said sampling,
a tap-coefficient adjuster to adjust said tap coefficients based on said error events,
an equalization signal generator to generate an equalization signal as a sum of products of the tap coefficients and data-symbol values of the data-symbol sequences, and
a reference signal adjuster to adjust the reference signals by applying a first bias to said equalization signal to yield a first of the reference signals, and a second bias or no bias to the equalization signal to yield a second reference signal offset with respect to the first reference signal.

10. A receiver as recited in claim 9 wherein said sampler modules include:
a first reference data sampler for sampling an input data signal relative to a receiver-output data reference level, and
a first offset data sampler for sampling said input data signal relative to an offset data reference level, said offset data reference level being offset with respect to said receiver-output data reference level at any given time during said sampling.

11. A receiver as recited in claim 10 wherein error events are detected at least in part by comparing outputs of different samplers of said sampler module.

12. A receiver as recited in claim 11 wherein said different samplers include said first offset sampler and a second offset sampler, each of said first offset sampler and said second offset sampler sampling said input data signal using offset reference levels that are offset from an output reference level used by an output sampler to sample said input data signal to obtain an output data-symbol sequence output from said receiver.

13. A receiver as recited in claim 12 wherein said output reference level is maintained between said offset data reference levels.

14. A receiver as recited in claim 11 wherein said different samplers include said first offset sampler and said output sampler.

15. A receiver as recited in claim 9 wherein each of said tap coefficients corresponds to a different inter-symbol interval size.

16. A process comprising:
amplifying a received data input signal;
sampling, using plural samplers, the amplified data input signal to yield plural respective data-symbol sequences, the sampling including sampling using a data output sampler using an output reference level to yield an output data-symbol sequence that is output from a receiver including the data output sampler;
identifying sampling events including error events based on the data-symbol sequences;
for each combination of error and tap coefficients for a decision feedback equalizer, determining an adjustment value;
accumulating adjustment values;
adjusting tap coefficients according to accumulated adjustment values; and
setting reference levels, including said output reference level, for samplers, based on tap coefficients and data-symbol sequences, the setting including,
generating an equalization signal as a sum of products of the tap coefficients and data-symbol values of the data-symbol sequences; and
applying a first bias to said equalization signal to yield a first of the reference signals, and a second bias or no bias to the equalization signal to yield a second reference signal offset with respect to the first reference signal.

17. A process as recited in claim 16 wherein the accumulating includes accumulating adjustment values for each tap coefficient over plural error events.

18. A process as recited in claim 16 wherein the sampling further includes sampling using an offset sampler using an offset reference level offset from the output reference level to yield an offset data-symbol sequence, the identifying including comparing the offset data-symbol sequence with the output data-symbol sequence.

19. A process as recited in claim 16 wherein the sampling further includes sampling using a first offset sampler using a first offset reference level higher than the output reference level and using a second offset sampler using a second offset reference level lower than the output reference level, the identifying including comparing outputs of the first offset sampler and the second offset sampler.

* * * * *

UNITED STATES PATENT AND TRADEMARK OFFICE
CERTIFICATE OF CORRECTION

PATENT NO. : 8,966,353 B2  
APPLICATION NO. : 13/285293  
DATED : February 24, 2015  
INVENTOR(S) : Dacheng Zhou et al.

Page 1 of 1

It is certified that error appears in the above-identified patent and that said Letters Patent is hereby corrected as shown below:

In the Drawings

In sheet 1 of 3, reference numeral 124, line 1, delete "COEFICIENT" and insert -- COEFFICIENT --, therefor.

In sheet 1 of 3, reference numeral 202, line 2, delete "SEQUENCESi" and insert -- SEQUENCES --, therefor.

Signed and Sealed this  
Twenty-third Day of June, 2015

Michelle K. Lee  
*Director of the United States Patent and Trademark Office*